[12] United States Patent
Stadtfeld

(10) Patent No.: US 11,173,560 B2
(45) Date of Patent: Nov. 16, 2021

(54) CUTTER WITH POSITIVE SEATED ROUND BLADE STICKS FOR BEVEL GEAR CUTTING

(71) Applicant: THE GLEASON WORKS, Rochester, NY (US)

(72) Inventor: Hermann J. Stadtfeld, Webster, NY (US)

(73) Assignee: THE GLEASON WORKS, Rochester, NY (US)

( * ) Notice: Subject to any disclaimer, the term of this patent is extended or adjusted under 35 U.S.C. 154(b) by 0 days.

(21) Appl. No.: 16/343,908

(22) PCT Filed: Nov. 14, 2017

(86) PCT No.: PCT/US2017/061479
§ 371 (c)(1),
(2) Date: Apr. 22, 2019

(87) PCT Pub. No.: WO2018/093755
PCT Pub. Date: May 24, 2018

(65) Prior Publication Data
US 2019/0255636 A1   Aug. 22, 2019

Related U.S. Application Data

(60) Provisional application No. 62/422,066, filed on Nov. 15, 2016.

(51) Int. Cl.
*B23C 5/22* (2006.01)
*B23F 21/22* (2006.01)

(52) U.S. Cl.
CPC .............. *B23F 21/226* (2013.01); *B23C 5/22* (2013.01)

(58) Field of Classification Search
CPC .. B23F 5/20; B23F 5/202; B23F 21/22; B23F 21/223; B23F 21/226; B23F 21/06;
(Continued)

(56) References Cited

U.S. PATENT DOCUMENTS 1,836,737 A * 12/1931 Walker .................. B23C 5/2437
407/41
4,093,391 A * 6/1978 Bachmann ............ B23F 21/226
407/22
(Continued)

FOREIGN PATENT DOCUMENTS

DE      10112165 B4     2/2004
EP       1240966 A2 *   9/2002   .............. B23F 21/22
WO     2017/136329 A1   8/2017

OTHER PUBLICATIONS

International Search Report and Written Opinion for PCT/US2017/061479, ISA/EP, dated Feb. 22, 2018, 14 pgs.

*Primary Examiner* — Nicole N Ramos
(74) *Attorney, Agent, or Firm* — Robert L. McDowell

(57) ABSTRACT

A cutter head (30) having stick blades (82) with a circular (62) or partially circular (72, 92, 102, 112, 122) cross-section wherein the circular part of the cross-section is dominating. The cutter head preferably includes cutter head slots (31) having a five-sided cross-section which will provide a defined positive seating between a clamp block (34) and the surfaces of the slots (35, 36). The stick blades cross-section preferably includes at least one flat section (77, 81, 98, 108, 109 118, 119, 128).

8 Claims, 13 Drawing Sheets

(58) Field of Classification Search
CPC ...... B23F 21/066; B23F 21/10; B23F 21/106; B23F 21/12; B23F 21/126; B23F 21/128; B23C 5/22
See application file for complete search history.

(56) References Cited

U.S. PATENT DOCUMENTS

| | | | | |
|---|---|---|---|---|
| 4,268,194 | A * | 5/1981 | Bloink | B23F 21/226 407/22 |
| 4,621,954 | A * | 11/1986 | Kitchen | B23F 21/226 407/22 |
| 5,934,841 | A | 8/1999 | Rutschke et al. | |
| 6,120,217 | A | 9/2000 | Stadtfeld | |
| 6,540,446 | B2 * | 4/2003 | Iizuka | B23F 21/226 407/113 |
| 6,632,050 | B2 * | 10/2003 | Erickson | B23F 21/226 407/21 |
| 8,747,030 | B2 * | 6/2014 | Ono | B23C 5/22 407/22 |
| 2008/0170915 | A1 | 7/2008 | Muhlfriedel | |
| 2011/0164931 | A1 * | 7/2011 | Ono | B23C 5/22 407/22 |
| 2015/0290725 | A1 | 10/2015 | Stadtfeld et al. | |

* cited by examiner

CUTTER WITH POSITIVE SEATED ROUND BLADE STICKS FOR BEVEL GEAR CUTTING

FIELD OF THE INVENTION

The present invention relates to cutting tools for bevel and hypoid gears and in particular to cutting tools having positive seated round blades sticks.

BACKGROUND OF THE INVENTION

Bevel and hypoid gears can be cut in a single indexing process (face milling) or in a continuous indexing process (face hobbing). A basic cutting setup in the generating or cradle plane will put the center of the cutter head in a position which is away from the generating gear center (cradle axis) by the amount of the so-called radial distance. The silhouette of the cutter blades represents one tooth of the generating gear while the cutter rotates. Common face cutters for bevel gear cutting have several blade groups with each blade group having between one and four blades made from high speed steel or carbide, for example. The most common cutters are alternating (completing) cutters having blade groups comprising one outside blade and one inside blade. In order to achieve an equal chip load of all inside blades and all outside blades during the cutting process, it is desirable to have the cutting edges of all outside blades follow each other and to have the cutting edges of all inside blades follow each other at the same respective radial position.

The cutters for bevel and hypoid gears generally comprise cutting blades formed from a length of bar stock material (e.g. high-speed steel or carbide) having a base or shank portion and a cutting end portion, including at least one cutting edge, at one end, or at both ends, of the base or shank. Such cutting blades are known as stick blades, bar blades or blade sticks. A plurality of cutting blades are usually arranged about a cutter head with the cutting ends of the blades projecting from a face of the cutter head. Such types of cutting tools are well known in the art of gear manufacture.

In most stick blade cutters, the cutter head is generally disk-shaped and includes blade mounting slots and a clamping provision for blade sticks. The cutter head slots, as known in the art, can have different cross sections such as square, rectangular, pentagon or round. The blade sticks for the different slot designs have the respective cross section of the slot. The stick blade dimensions are defined by amounts slightly smaller than the cutter head slot dimensions which allow a blade to be inserted into a slot.

The known square and rectangular blade systems hold the blades in position against the cutting forces by friction. The blades with a pentagon shaped cross section are held in position against the cutting forces by a positive seating. In the case of a round blade cross section, the blades can be either held by friction or by a positive seating, depending on the clamping principle.

SUMMARY OF THE INVENTION

The invention comprises a cutter head having stick blades with a circular or partially circular cross-section wherein the circular part of the cross-section is dominating. The cutter head preferably includes cutter head slots having a five-sided cross-section which will provide a defined positive seating between a clamp block and the surfaces of the slots. The stick blades cross-section preferably includes at least one flat section.

An embodiment of the invention comprises a bevel and hypoid gear cutting tool comprising a disk-shaped cutter head having a plurality of cutting blade mounting slots and a cutting blade positioned in at least one of the cutting blade mounting slots wherein the cutting blade projects from a face of the cutter head. The cutting blade has a length and includes a shank portion and a cutting end portion wherein the shank portion has a cross-sectional shape defined with respect to a plane oriented perpendicular to the length. The cutting blade shank cross-section has a circumference wherein more than half of the cross-sectional circumference is circular in shape. The plurality of cutting blade mounting slots in the cutter head each has five sides.

Another embodiment of the invention comprises a bevel and hypoid gear cutting tool comprising a disk-shaped cutter head having a plurality of cutting blade mounting slots and a cutting blade positioned in at least one of the cutting blade mounting slots wherein the cutting blade projects from a face of the cutter head. The cutting blade has a length and includes a shank portion and a cutting end portion wherein the shank portion has a cross-sectional shape defined with respect to a plane oriented perpendicular to the length. The cutting blade shank cross-section has a circumference wherein more than half of the cross-sectional circumference is circular in shape. The cutting blade shank portion further includes at least one flat surface extending along the length of the shank whereby the shank cross-section further includes at least one straight line portion. The cutting blade mounting slots in the cutter head each comprise at least four sides with at least one flat surface being seated against at least one of the sides.

Another embodiment of the invention comprises a cutting blade blank for a stick-type cutting blade with the blank having a length extending between a first end and a second end. The blank includes a cross-sectional shape defined with respect to a plane oriented perpendicular to the length with the cross-sectional shape having a circumference wherein more than half of the cross-sectional circumference is circular in shape. The blank further includes at least two flat surfaces extending along the length of the blank whereby the cross-sectional shape of the blank further includes at least two straight line portions.

Figure 5:
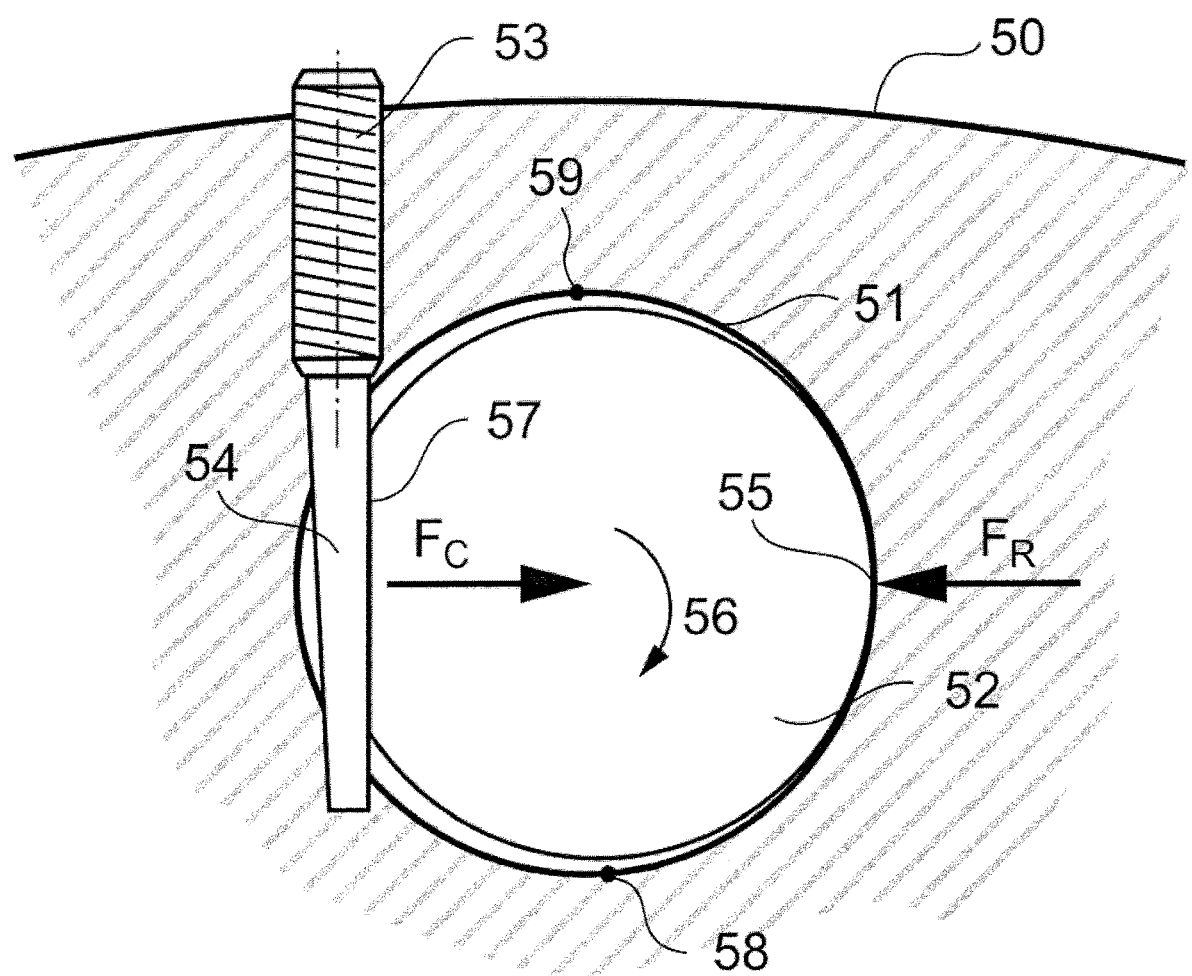
FIG. 5 shows a cutter head section with a circular (round) slot cross section and a blade which has a circular (round)

cross section where the circular shape is interrupted by the flat section. The diameter of the slot is larger than the diameter of the blade. The arrangement in FIG. 5 provides positive seating.

Figure 6:
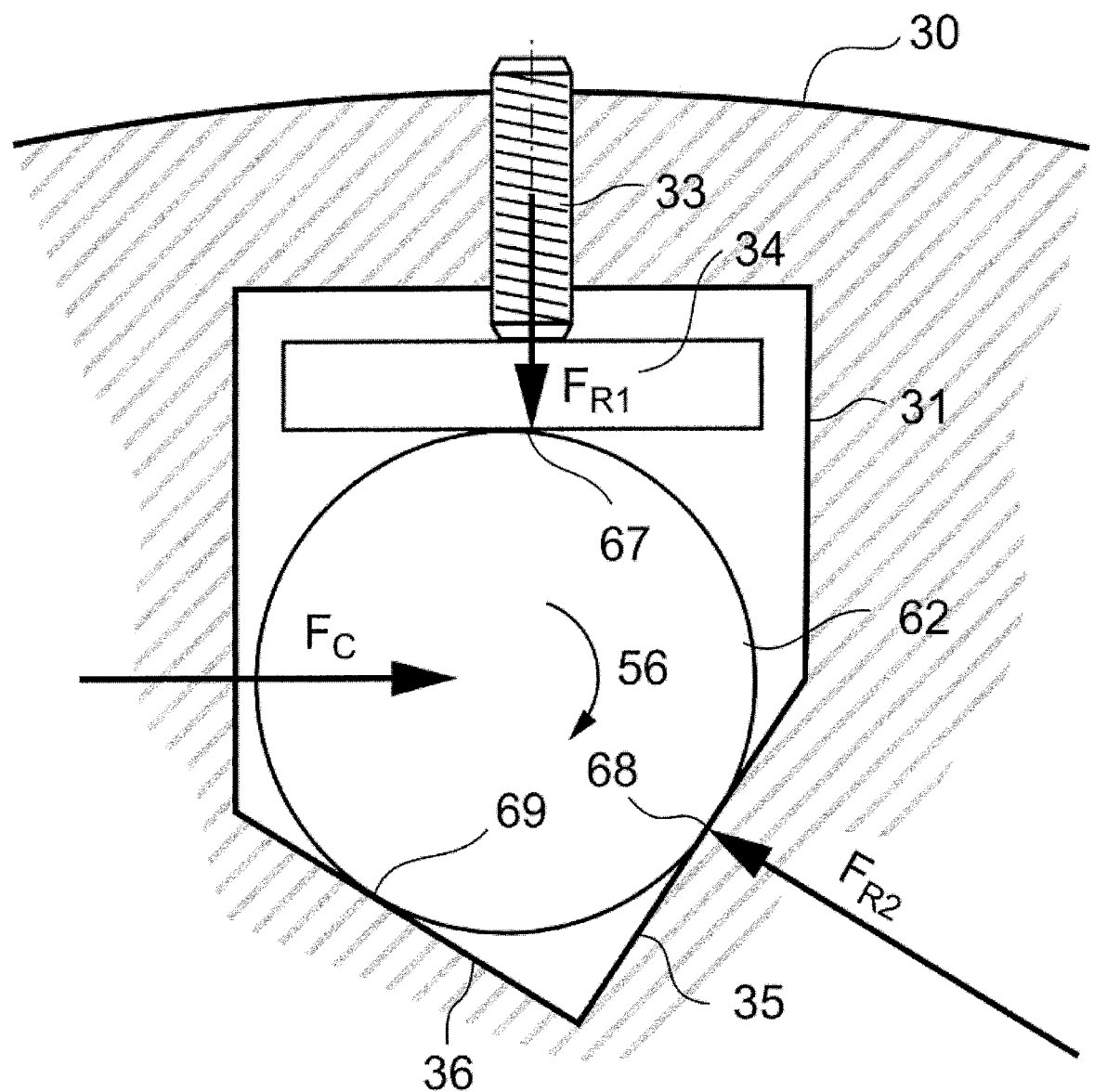

FIG. 6 shows a cutter head section with a five sided (pentagon shaped) slot cross section and a blade which has a circular (round) cross section. The blade is clamped between three contacting points which gives the arrangement in FIG. 6 a positive seating but no means for a rotational orientation (direction 56).

Figure 7:
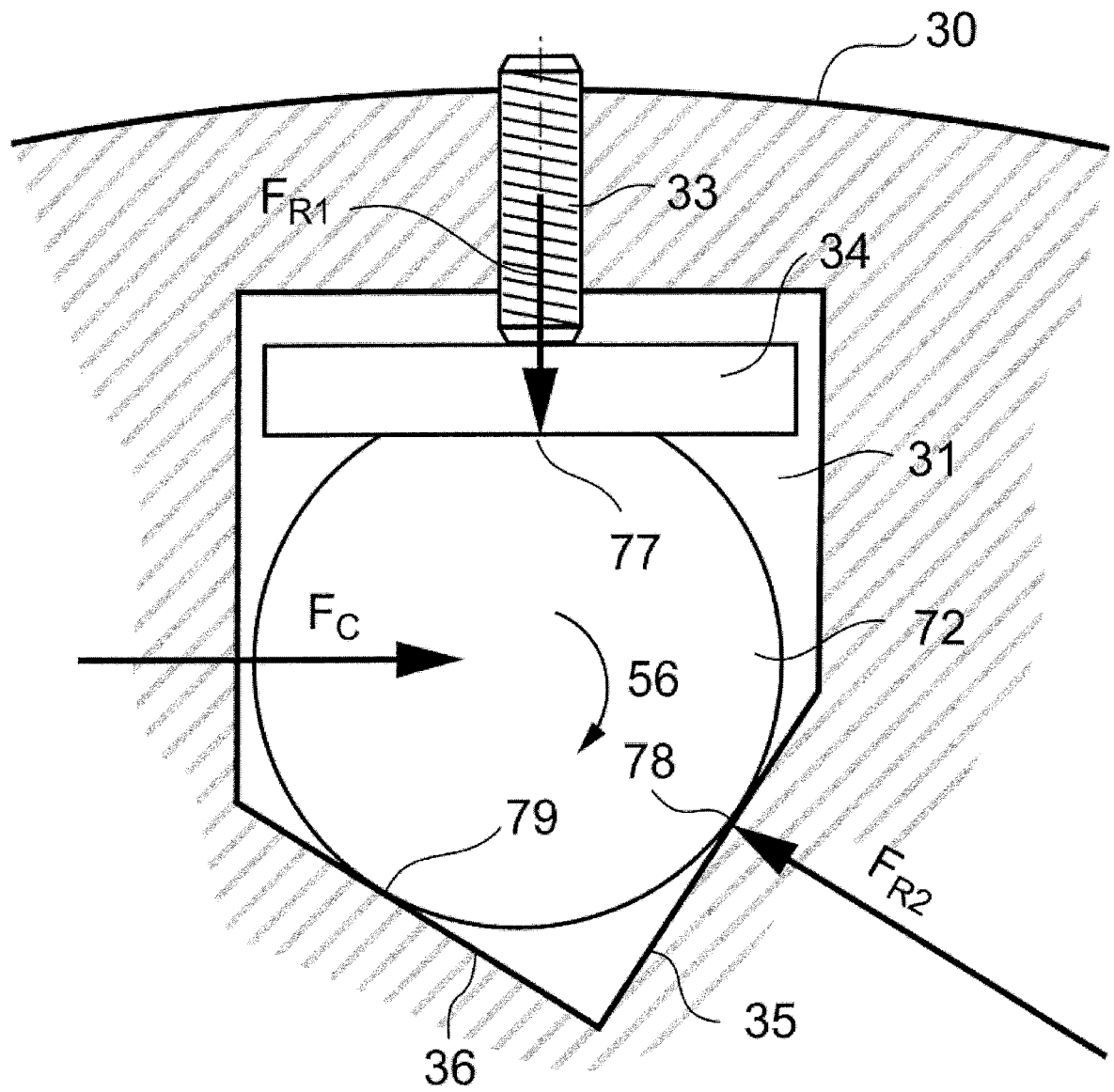

FIG. 7 shows a cutter head section with a five sided (pentagon shaped) slot cross section and a blade which has a circular (round) cross section where the circular shape is interrupted by a flat section. The blade is clamped between one contacting surface and two contacting points which gives the arrangement in FIG. 7 a positive seating and an approximate rotational orientation (direction 56) with low stiffness.

Figure 8A:
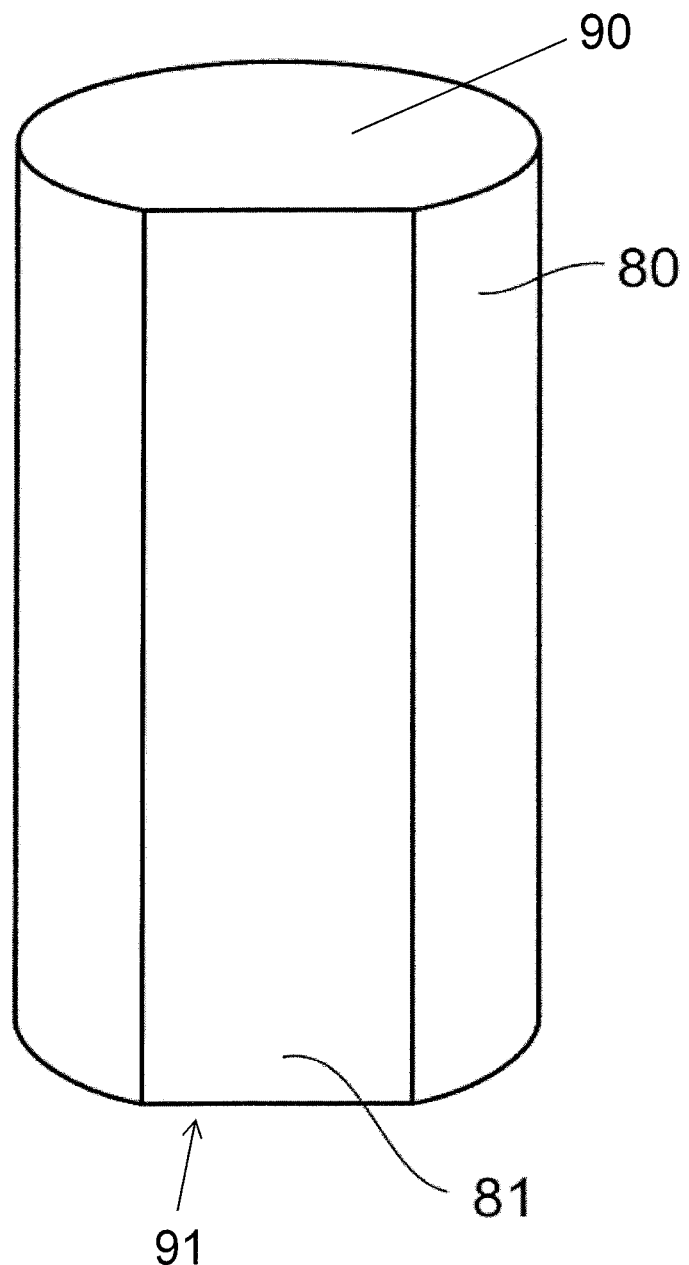

FIG. 8(a) shows a three dimensional view of a cylindrical blade stick blank with a flat section extending in the lengthwise direction of the blade stick.

Figure 8B:
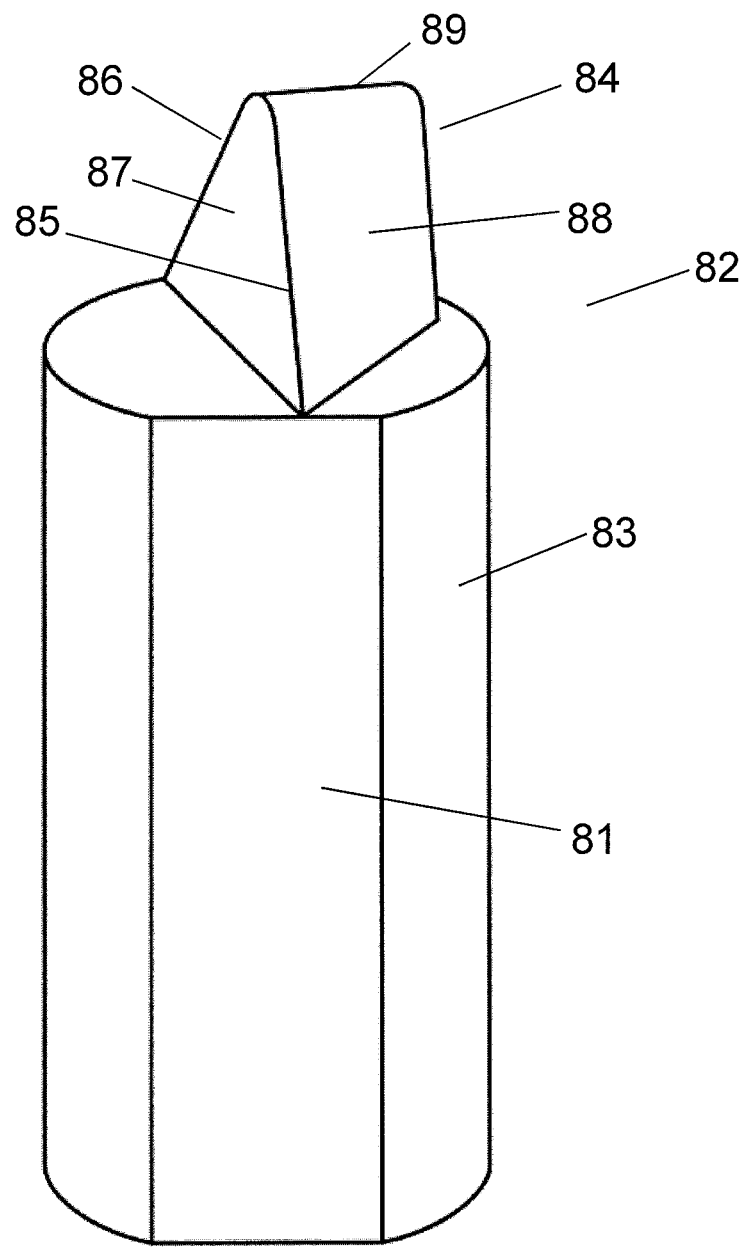

FIG. 8(b) shows a three dimensional view of a cutting blade having a blade shank portion with a flat section extending in the lengthwise direction of the shank portion.

Figure 9:
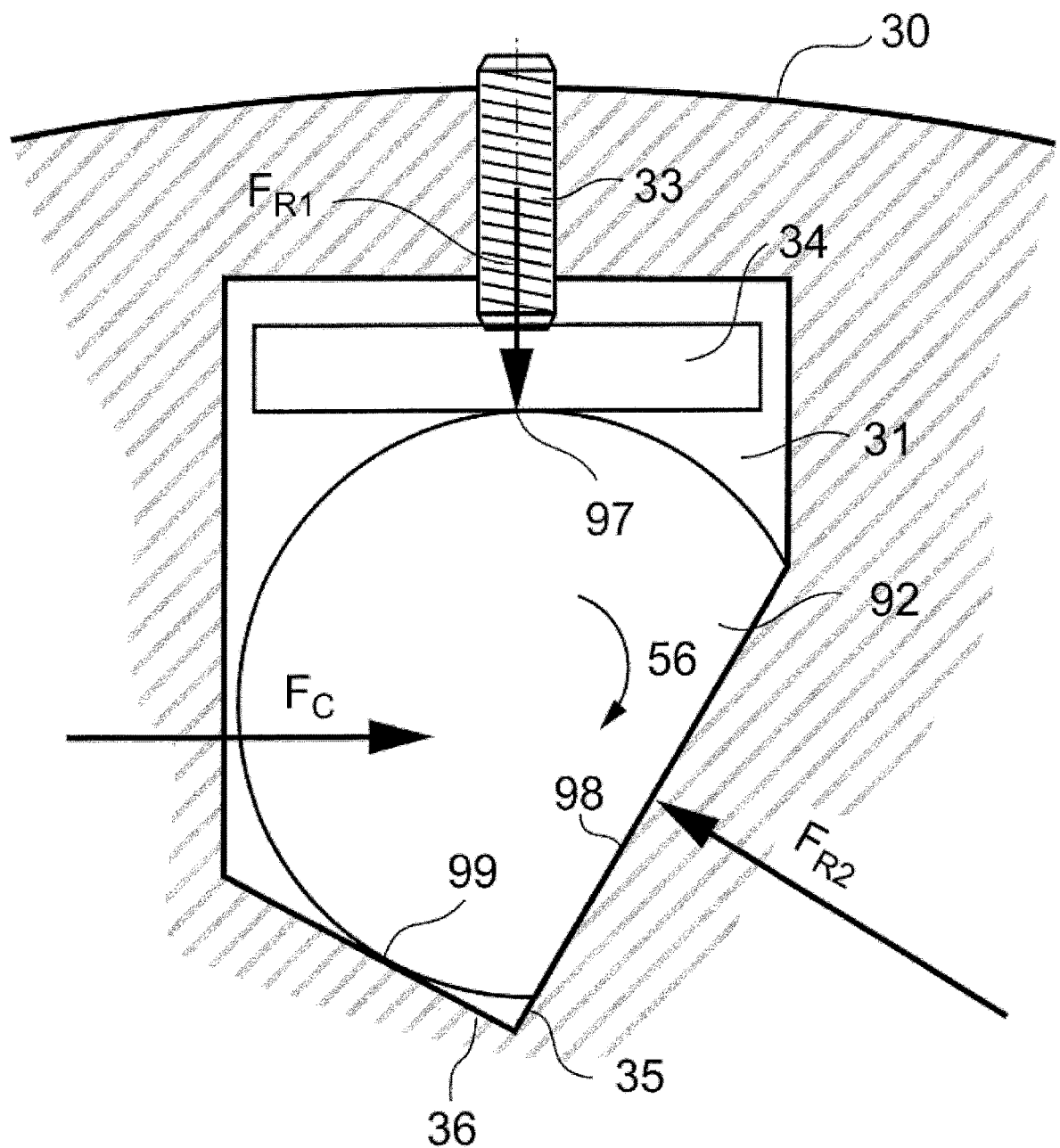

FIG. 9 shows a cutter head section with a five sided (pentagon shaped) slot cross section and a blade which has a circular (round) cross section where the circular shape is interrupted by a flat section. The blade is clamped between one contacting surface and two contacting points which gives the arrangement in FIG. 9 a positive seating and a precise and stiff rotational orientation (direction 56).

Figure 10:
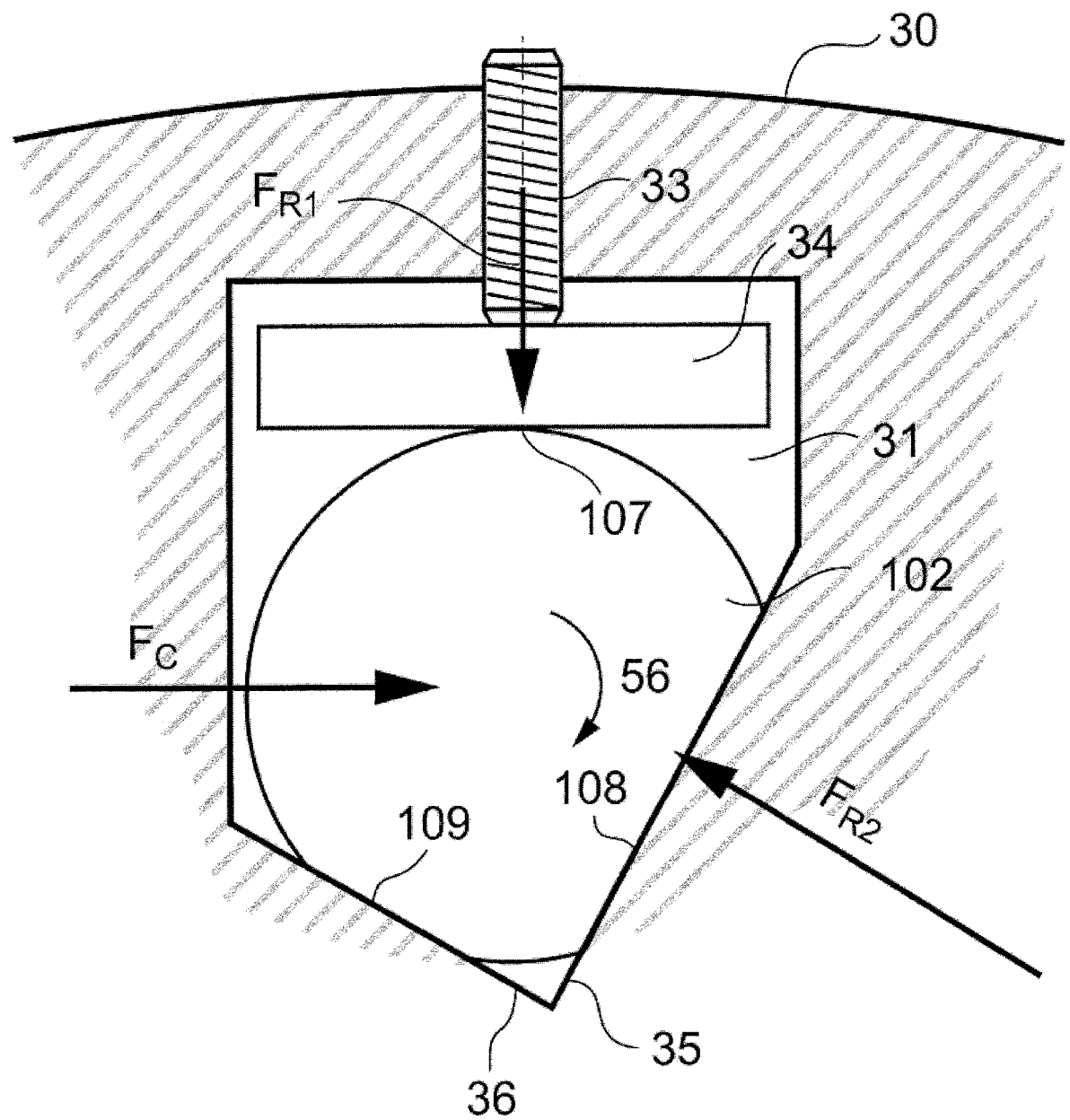

FIG. 10 shows a cutter head section with a five sided (pentagon shaped) slot cross section and a blade which has a circular (round) cross section where the circular shape is interrupted by two flat sections. The blade is clamped between two contacting surfaces and one contacting point which give the arrangement in FIG. 10 a positive seating and a precise and stiff rotational orientation (direction 56).

Figure 11:
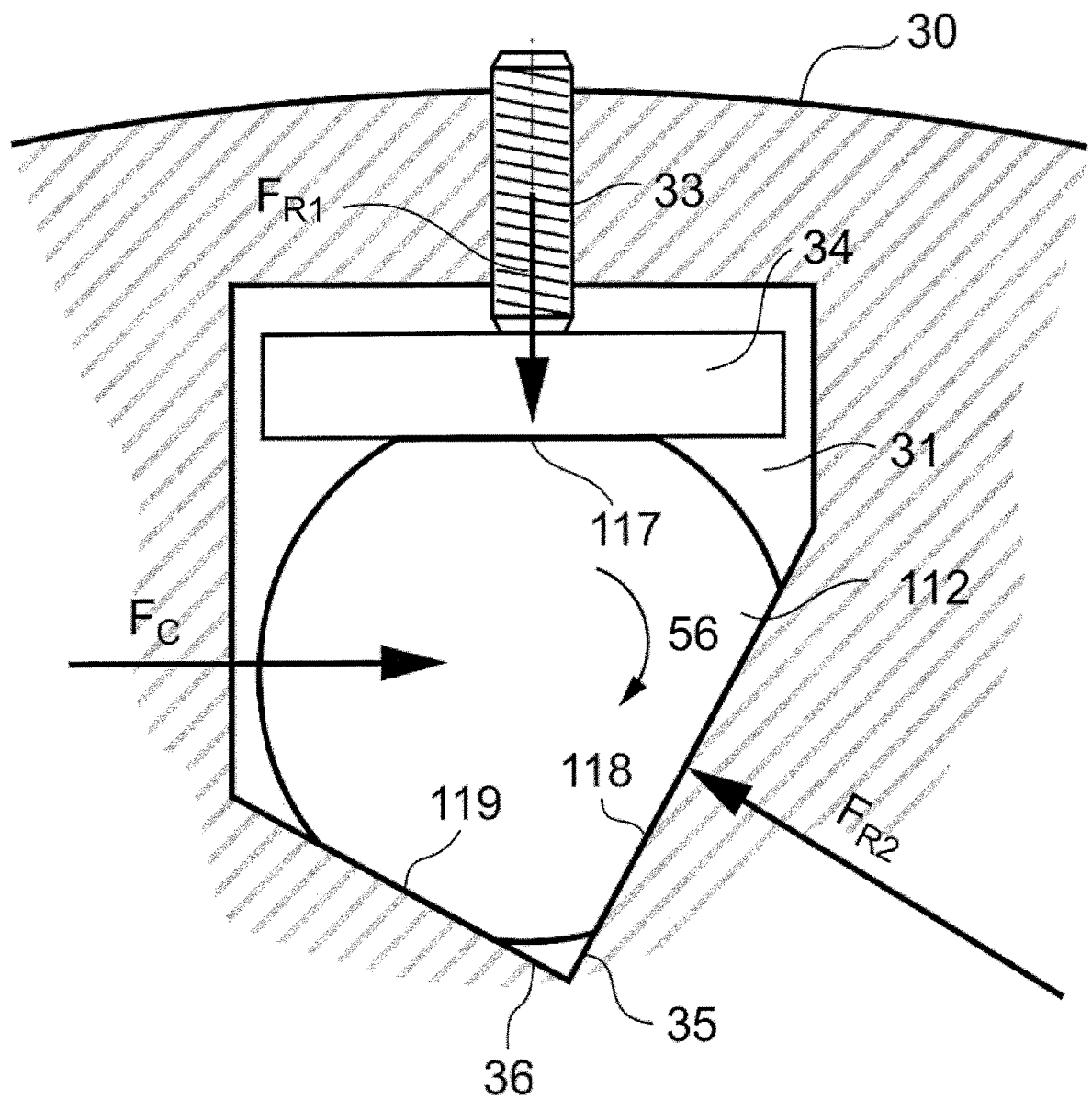

FIG. 11 shows a cutter head section with a five sided (pentagon shaped) slot cross section and a blade which has a circular (round) cross section where the circular shape is interrupted by three flat sections. The blade is clamped between three contacting surfaces which gives the arrangement in FIG. 11 a positive seating and a precise and stiff rotational orientation (direction 56).

Figure 12:
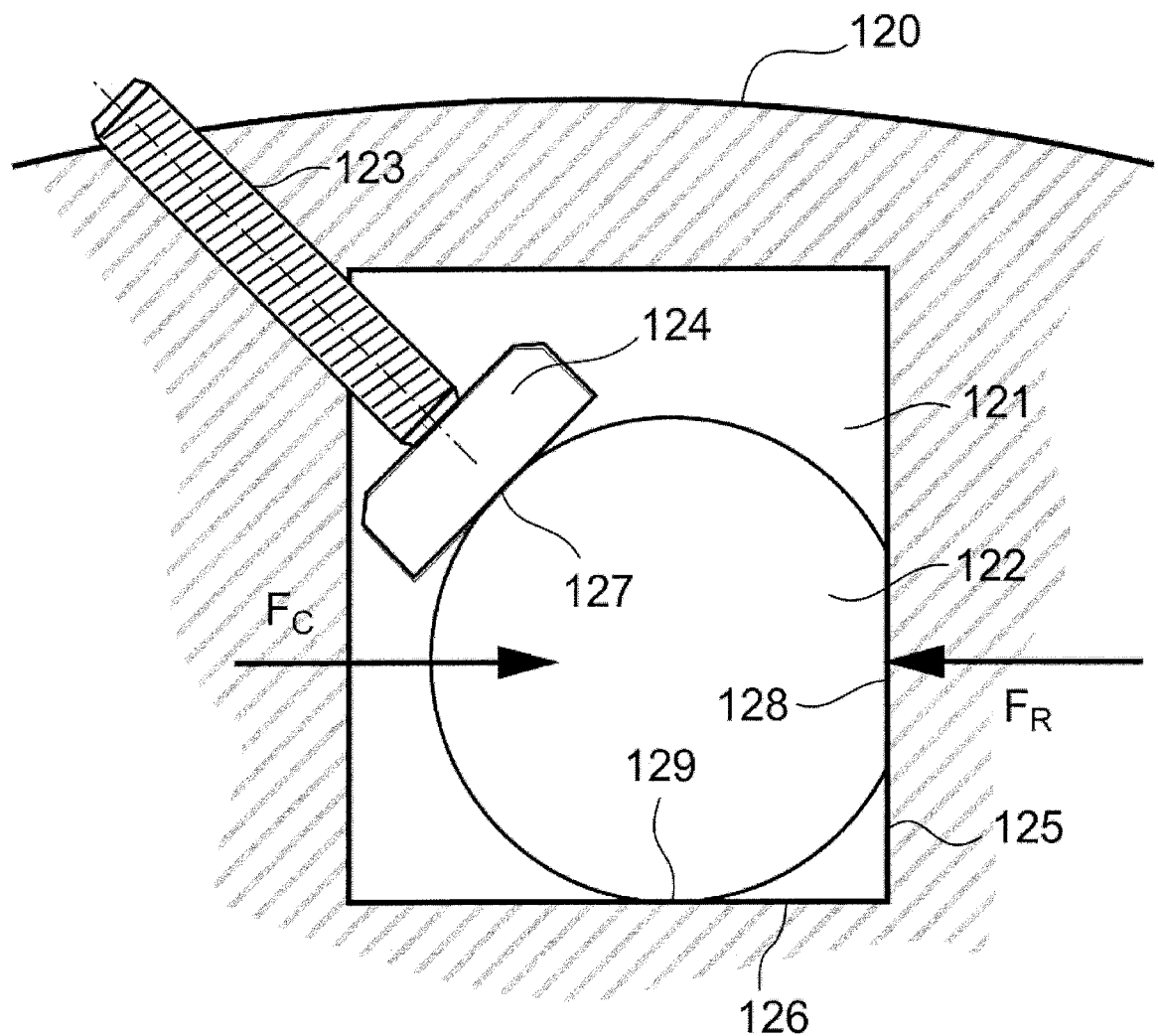

FIG. 12 shows a cutter head section with a rectangular slot and a blade which has a circular (round) cross section where the circular shape is interrupted by a flat section. The blade is clamped between one contacting surface and two contacting points which gives the arrangement in FIG. 12 a positive seating principle.

DETAILED DESCRIPTION OF THE PREFERRED EMBODIMENT

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

Figure 1:
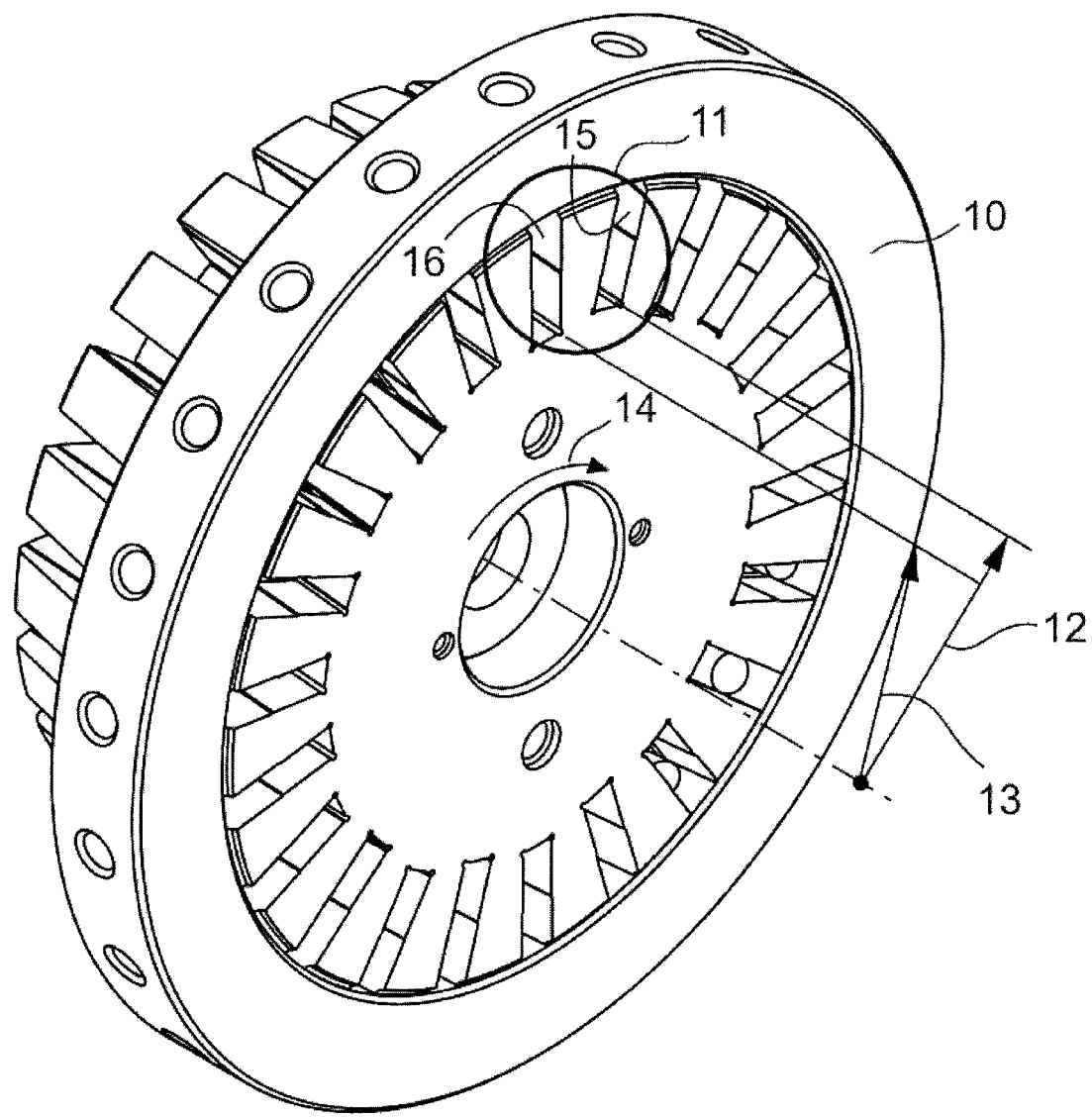
FIG. 1 shows a three-dimensional view of a face milling cutter head with rectangular blade slots.

FIG. 1 shows a three-dimensional view of a face milling cutter head 10 with rectangular outside blade slots 15 and rectangular inside blade slots 16 extending lengthwise between the top and bottom of the cutter head 10. Slots 15 and 16 represent one blade group 11. Cutter head 10 rotates in the cutting process in direction 14.

Figure 2:
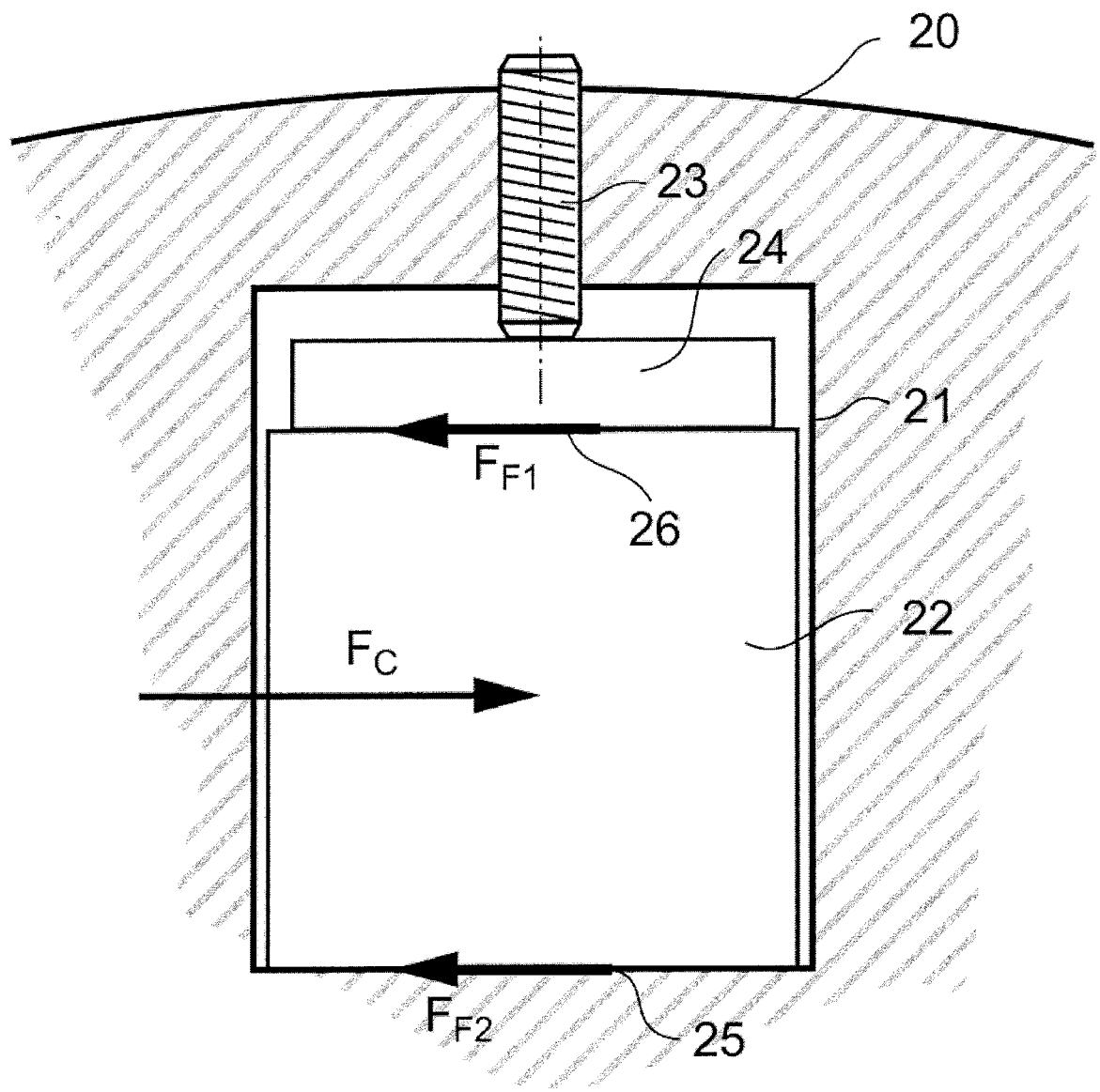
FIG. 2 shows a cutter head section with a rectangular slot cross section and a rectangular blade cross section. The clamping force uses friction to hold the blade in its position against the cutting force $F_C$.

FIG. 2 shows a cutter head section 20 with a rectangular slot 21 and a rectangular blade 22. Clamp screw 23 is in contact with clamp block 24 which allows the surfaces 25 and 26 to develop a friction forces $F_{F1}$ and $F_{F2}$ in the same magnitude but opposite direction than the cutting force $F_C$ ($F_C = -F_{F1} - F_{F2}$).

Figure 3:
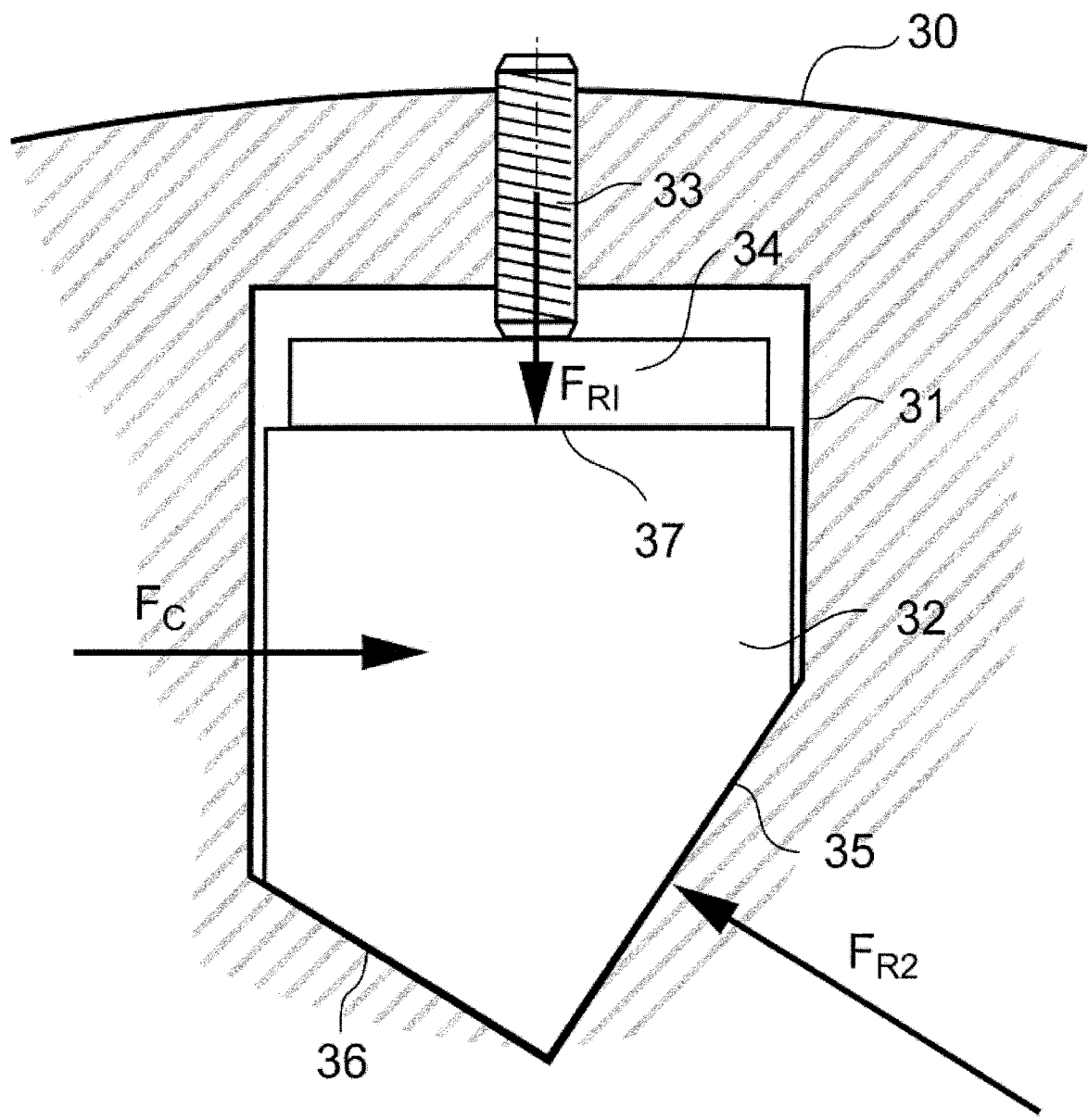
FIG. 3 shows a cutter head section with a five sided slot cross section and a five sided blade cross section. The clamping force presses the blade via contacting surface combination into the prismatic seat consisting of the contacting surfaces which results in a positive (form) seating.

FIG. 3 shows a cutter head section 30 with a five sided (pentagon shaped) slot 31 and a five sided blade 32 such as disclosed in U.S. Pat. No. 6,120,217 to Stadtfeld et al. for example. Clamp screw 33 is in contact with the clamp block 34 and presses the blade 32, via surface 37, into the two prismatic seating surfaces 35 and 36. In case a cutting force $F_C$ is applied, the reaction Forces $F_{R1}$ and $F_{R2}$, which are perpendicular to the surfaces 37 and 35, will act against the cutting force $F_C$ and balance it (equilibrium). The tight and positive blade seating will allow the reaction forces to adjust (theoretically) to any cutting force magnitude because the reaction forces are independent from any surface friction.

Figure 4:
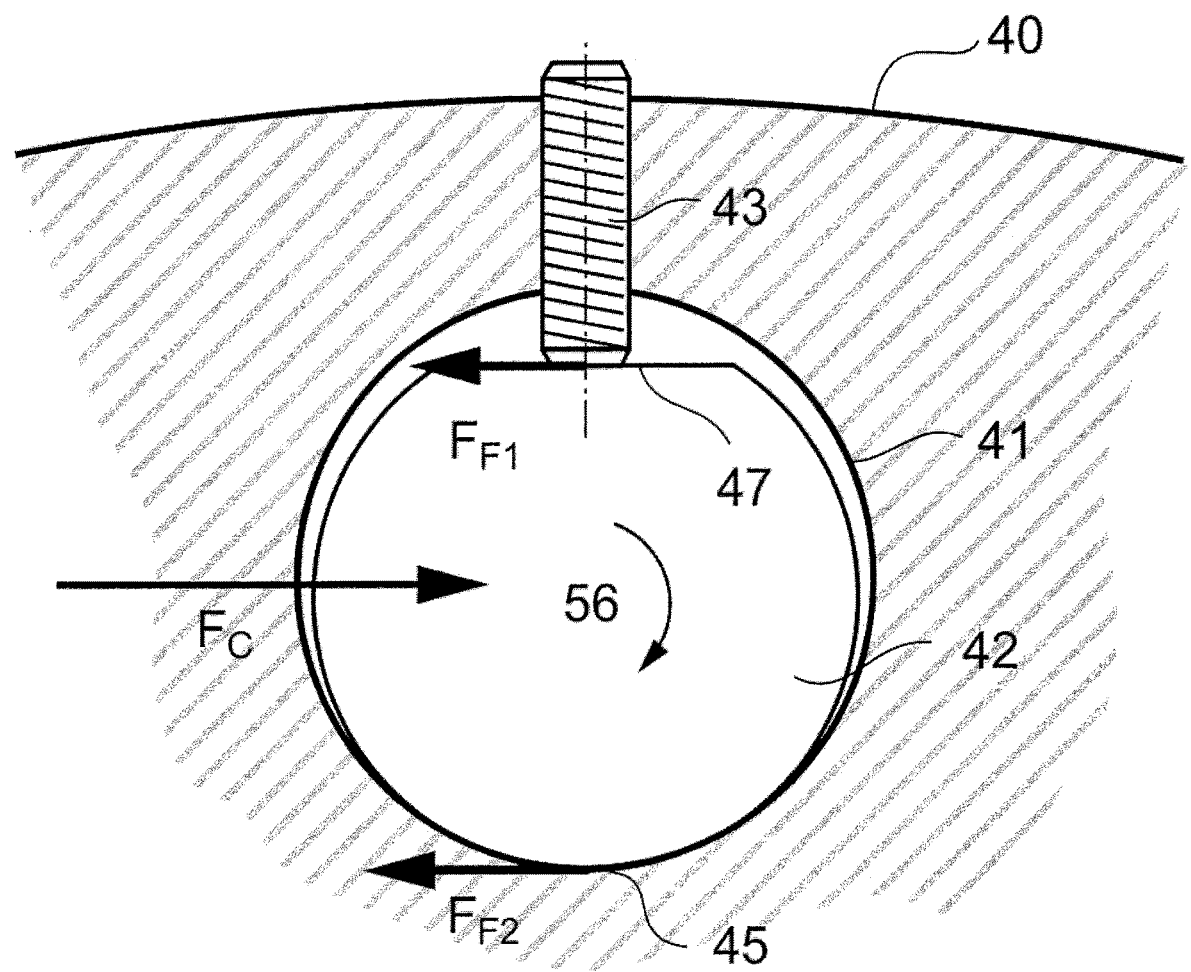
FIG. 4 shows a cutter head section with a circular (round) slot cross section and a blade which has a circular (round) cross section where the circular shape is interrupted by a flat section. The diameter of the slot is larger than the diameter of the blade. The arrangement in FIG. 4 provides friction seating.

FIG. 4 shows a cutter head section 40 with a round slot 41 and a round blade 42 having a flat section 47. The diameter of the blade 42 has to be smaller than the diameter of the cutter slot 41 in order to provide a clearance fit between slot and blade for quasi force free insertion of the blades. Clamp screw 43 is in contact with blade surface 47 and presses the blade 42 against point 45. Depending on the curvature differences, point 45 will spread to a contacting surface area. In case of the presence of a cutting force $F_C$, the reaction forces $F_{F1}$ (friction force on surface 47) and $F_{F2}$ (friction force in point 45) will act against the cutting force with the same magnitude but opposite direction. In case of high cutting forces, the friction forces $F_{F1} + F_{F2}$ might be smaller than the magnitude of the cutting force $F_C$, which will result in a blade slippage. Another disadvantage of the arrangement in FIG. 4 can be seen in the clamp screw 43 contacting blade flat section 47 as the only geometrical feature to provide a defined rotational seating orientation 56 which is insufficient for cutting blades.

FIG. 5 shows a cutter head section 50 with a round slot 51 and a round blade 52 having a flat section 57. The diameter of the blade 52 has to be smaller than the diameter of the cutter slot 51 in order to provide a clearance fit between slot and blade for quasi force free insertion of the blades. Clamp screw 53 is in contact with a tapered pin or wedge 54 which is in contact with the flat section 57 of the stick blade 52. Wedge 54 presses the blade 52 against the contact location 55. The first contact in the cross sectional representation of FIG. 5 is a point contact at location 55. As the clamping force increases, the contacting point will elastically deflect and spread to a contacting area. Cutting force $F_C$ will create a reaction force $F_R$. Although this round blade clamping design uses a positive seating principle, a blade movement towards point 58 or point 59 due to cutting vibrations is expected. At the time of blade clamping via screw 53 the round blade stick will find a final seating position between point 58 and point 59 which is rather random. The arrangement in FIG. 5 provides a sufficient rotational seating orientation with wedge 54 seated against blade flat section 57. Examples of such seating arrangements are shown in U.S. Pat. No. 5,934,841 to Rutschke et al. and DE 10112165 B4 to Richardt.

FIG. 6 shows a cutter head section 30 with a five sided slot cross section 31 and a round blade 62. Clamp screw 63 is in contact with a clamp block 34. Clamp block 34 contacts the round stick blade cross section at point 67. The design in FIG. 6 provides a positive seating of the blade 62 between the points 67, 68 and 69. The contacting points 67, 68 and 69 will spread to contacting areas. Cutting force $F_C$ will create a reaction forces $F_{R1}$ and $F_{R2}$ ($F_C = -F_{R1} - F_{R2}$). This round blade clamping design uses a positive seating principle with a favorable arrangement of the reaction forces which will prevent blade shifting within the drawing plane under high cutting loads or cutting vibrations. Due to the limited contact area at points 67, 68 and 69, the overall system stiffness of the arrangement in FIG. 6 is lower than the system stiffness in FIG. 3. The significant advantage of the arrangement in FIG. 6 is that readily available and inexpensive cylindrical sticks can be utilized as cutting blades. A disadvantage of the arrangement in FIG. 6 can be seen in the missing geometrical feature which provides a defined rotational seating orientation 56.

FIG. 7 shows a cutter head section 30 with a five sided slot cross section 31 and a partially round blade 72. Clamp screw 33 is in contact with a clamp block 34. Clamp block 34 contacts the round stick blade cross section at the flat section 77. The design in FIG. 7 provides a positive seating of the blade 72 between the flat section 77 and the contacting points 78 and 79. The contacting points 78 and 79 will spread to contacting areas due to the force from the clamp block 34. Cutting force $F_C$ will create a reaction forces $F_{R1}$ and $F_{R2}$ ($F_C = -F_{R1} - F_{R2}$). This round blade clamping design uses a positive seating principle with a favorable arrangement of the reaction forces which will prevent blade shifting within the drawing plane under high cutting loads or cutting vibrations. Due to the limited contact area at points 78 and 79, the overall system stiffness of the arrangement in FIG. 7 is lower than the system stiffness in FIG. 3. The significant advantage of the arrangement in FIG. 7 is that readily available and inexpensive cylindrical sticks can be utilized as cutting blades but a flat section 77 has to be machined along the entire cylinder (shown in FIG. 8). The rotational orientation 56 of blade 72 is provided by the flat section 77. The contact between clamp block 34 and blade 72 at the flat section 77 cannot maintain the precise rotational blade position 56 in case of high forces and vibrations.

FIG. 8(a) shows a three dimensional view of a cylindrical blade stick blank 80 with a flat section 81 and having a length extending between the top 90 and bottom 91 ends (as viewed) of the blank 80. Preferably, flat section 81 has a minimum width of about 2 mm and extends the entire length of the blank 80 although the flat section 81 may extend only along a portion of the length. More than one flat section (e.g. two or three) may be arranged about the circumference of the blank. Cylindrical sticks of different diameters having a precision ground finish are readily available and inexpensive. The flat section has to be roughed out and finish ground on fully cylindrical sticks. The roughing of the flat section can be accomplished, for example, by wire EDM or rough grinding.

FIG. 8(b) shows an example of a cutting blade 82 formed from the blade blank of FIG. 8(a). The cutting blade comprises a base or shank portion 83 having a flat section 81 extending in the lengthwise direction of the shank portion 83. A cutting end 84 is provided at one end of the shank 83 with the cutting end including, for example, a cutting edge 85, clearance edge 86, front rake face 87, cutting side relief surface 88 and tip relief surface 89.

The invention comprises a cutter head which uses stick blades with a predominately or partially circular cross section wherein the circular part of the cross section is dominating which is understood to mean that more than half of the cross-sectional circumference is circular in shape. The more-than-half of the cross-sectional circumference of a stick blade can be a single continuous circular arc with a single flat surface portion (e.g. FIGS. 9 and 12) such as that described by a circle having a single geometrical secant line. Alternatively, the circular portion of the blade cross section may be the sum of two or more circular arcs with each blade having more than one flat surface portions (e.g. FIGS. 10 and 11) such as that described by a circle having more than one geometrical secant lines. For purposes of describing the invention, the term "cross-section" of a blade is understood to be a defined by a plane passing through a cutting blade or a cutting blade blank wherein the plane is oriented perpendicular to the length of the cutting blade or the cutting blade blank. Similarly, the "cross-section" of a cutting blade mounting slot is understood to be defined by a plane passing through a blade mounting slot wherein the plane is oriented perpendicular to the length of the blade mounting slot.

An additional preferred element of the invention is cutter head slots having a five-sided cross section which will provide a defined positive seating between a clamp block and the surfaces of the slots. In order to combine a defined and precise positive seating with a precise rotational orientation and a high seating stiffness against the cutting forces $F_C$, the preferred embodiment of the invention includes at least one flat section on the cutting blade. The flat section is in contact with the slot seating surface which is the slot surface with the highest reaction force component when cutting forces are present.

FIG. 9 shows a partial cutter head 30, a cutter head section 35 with a five-sided slot cross section 31 and a partially round blade 92 which has one flat section 98 preferably having a minimum width of about 2 mm. Clamp screw 33 is in contact with a clamp block 34. Clamp block 34 contacts the round stick blade cross section at point 97. The embodiment shown in FIG. 9 provides a positive seating of the blade 92 between the clamp block and point 97, the seating surface 36 and blade point 99 and the seating surface 35 and blade flat section 98. The contacting points 97 and 99 will spread to contacting areas due to the force from the clamp block 34. Cutting force $F_C$ will create a reaction forces $F_{R1}$ and $F_{R2}$ ($F_C = -F_{R1} - F_{R2}$). This round blade clamping design uses a positive seating principle with a favorable arrangement of the reaction forces which will prevent blade shifting within the drawing plane under high cutting loads or cutting vibrations. Due to the large contact area between flat section 98 and seating surface 35 (which delivers the highest cutting reaction force component $F_{R2}$), the overall system stiffness of the arrangement in FIG. 9 is between the respective system stiffness of the arrangements shown in FIG. 3 and FIG. 6. The significant advantage of the arrangement in FIG. 9 is the fact that readily available and inexpensive cylindrical sticks (e.g. high speed steel or carbide) can be utilized as cutting blades after a flat section 98 is machined along the cylinder, preferably along the entire cylinder, such as shown in FIG. 8. The rotational orientation 56 of blade 92 is provided with high precision and stiffness by the flat section 98.

The invention further encompasses the inclusion of two flat sections on the cylindrical blade stick 102. The two flat surfaces 108 and 109 on the cylindrical blade stick 102 can be oriented in order to contact the seating surface 35 and 36 of the five-sided slot cross section 31 such as shown in FIG. 10. It is also possible to orient one flat section to contact seating surface 35 and a second flat section to contact the clamp block 34 or to orient one flat section to contact seating surface 36 and a second flat section to contact the clamp block 34.

FIG. 10 shows a cutter head section 30 with a five-sided slot cross section 31 and a partially round blade 102 having two flat sections 108 and 109 each preferably having a minimum width of about 2 mm. Clamp screw 33 is in contact with a clamp block 34. Clamp block 34 contacts the round stick blade cross section at point 107. The embodiment of FIG. 10 provides a positive seating of the blade 102 between the clamp block and point 107, the seating surface 36 and blade flat section 109 and the seating surface 35 and blade flat sections 108. The contacting point 107 will spread to contacting areas due to the force from the clamp block 34. Cutting force $F_C$ will create a reaction forces $F_{R1}$ and $F_{R2}$ ($F_C = -F_{R1} - F_{R2}$). The round blade clamping design uses a positive seating principle with a favorable arrangement of the reaction forces which will prevent blade shifting within the drawing plane under high cutting loads or cutting vibrations. Due to the large contact area between flat section 108 and seating surface 35 (which delivers the highest cutting reaction force component $F_{R2}$) and the large contact area between flat section 109 and seating surface 36, the overall system stiffness of the arrangement in FIG. 10 is higher than the stiffness of the arrangement in FIG. 9. The significant advantage of the arrangement in FIG. 10 is the fact that readily available and inexpensive cylindrical sticks (e.g. high speed steel or carbide) can be utilized as cutting blades after two flat sections 108 and 109 are machined along the entire cylinder. The rotational orientation of blade 102 is provided with high precision and stiffness by the two flat sections 108 and 109.

Cylindrical stick blades 112 with three flat sections 117, 118, and 119 are also contemplated. FIG. 11 shows a cutter head section 30 with a five-sided slot cross section 31 and a partially round blade 112 with three flat sections 117, 118 and 119 each preferably having a minimum width of about 2 mm. Clamp screw 33 is in contact with a clamp block 34. Clamp block 34 contacts the stick blade at section 117. The embodiment of FIG. 11 provides a positive seating of the blade 112 between the clamp block and flat section 117, the seating surface 36 and blade flat section 119 and the seating surface 35 and blade flat sections 118. Cutting force $F_C$ will create a reaction forces $F_{R1}$ and $F_{R2}$ ($F_C = -F_{R1} - F_{R2}$). This round blade clamping design uses a positive seating principle with a favorable arrangement of the reaction forces which will prevent blade shifting within the drawing plane under high cutting loads or cutting vibrations. Due to the large contact area between flat section 118 and seating surface 35 (which delivers the highest cutting reaction force component $F_{R2}$), the large contact area between flat section 119 and seating surface 36 and the large contact area between flat section 117 and the clamp block 34, the overall system stiffness of the arrangement in FIG. 11 is higher than the stiffness of the arrangement in FIG. 10 and similar to the clamping stiffness of the arrangement in FIG. 3. The arrangement in FIG. 11 uses a cylindrical blade blank (e.g. high speed steel or carbide) which requires the machining of three flat sections along the cylinder before it can be utilized as cutting blades. The rotational orientation of blade 112 is provided with high precision and stiffness by the three flat sections 117, 118 and 119.

FIG. 12 shows a cutter head section 120 with a slot 121 which has a rectangular cross section and a round blade 122 which has a flat section 128 preferably having a minimum width of about 2 mm. Clamp screw 123 is in contact with a clamp block 124. Clamp block 124 contacts the round stick blade cross section at point 127. The embodiment of FIG. 12 provides a positive seating of the blade 122 between the clamp block and point 127, the seating surface 126 and blade point 129 and the seating surface 125 and blade flat sections 128. The contacting points 127 and 129 will spread to contacting areas due to the force from the clamp block 124. Cutting force $F_C$ will create a reaction forces $F_R$ of the same magnitude and opposite direction. This round blade clamping design uses a positive seating principle with a favorable arrangement of the reaction forces which will prevent blade shifting within the drawing plane under high cutting loads or cutting vibrations. The significant advantage of the arrangement in FIG. 12 is the fact that readily available and inexpensive cylindrical sticks (e.g. high speed steel or carbide) can be utilized as cutting blades after a flat section 128 is machined preferably along the entire cylinder (shown in FIG. 8). The rotational orientation of blade 122 is provided with high precision and stiffness by the flat section 128.

The inventive cutter system design preferably uses five-sided cutter head slots with plane surfaces. However, it is possible to combine the advantages of the inventive cutter system with the advantages of radially truable cutter heads by modifying one of the seating surfaces and implementation of one adjustment screw per slot as disclosed in, for example, US 2015/0290725 to Stadtfeld et al.

The inventive cutter system is also applicable to those cutter head slots which have slightly reduced radii of their inside blade slots which allows the insertion of identical blades (full profile blades) in both inside and outside slots in order for the blades in the outside slots to act as outside blades and in order for the blades in the inside slots to act as inside blades such as disclosed in, for example, WO 2017/136329. The implementation of radial spacers which are assembled at the seating surfaces of each of the slots, or of a partial quantity of the cutter head slots, is possible and can be useful, for example, to increase the range of different nominal cutter radii that can be applied to one particular cutter head.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A bevel and hypoid gear cutting tool comprising a disk-shaped cutter head having a plurality of cutting blade mounting slots and a cutting blade positioned in at least one of said cutting blade mounting slots wherein said at least one cutting blade projects from a face of said cutter head, said at least one cutting blade having a length and including shank portion and a cutting end portion wherein said shank portion has a cross-sectional shape defined with respect to a plane oriented perpendicular to said length, wherein said gear cutting tool further comprises:

said cutting blade shank cross-section having a circumference wherein more than half of the cross-sectional circumference is circular in shape, the cutting blade shank portion further including at least one flat surface extending along the entire length of the shank whereby said cross-section further includes at least one straight line portion, said plurality of cutting blade mounting slots each comprising at least four sides with each side having a plane surface and with said at least one flat surface of said cutting blade shank being seated against at least one of said plane surface sides of the mounting slot, said seated plane surface side of the mounting slot being the mounting slot surface with the highest reaction force component when cutting forces are present.

2. The tool of claim 1 further comprising a clamp block with said clamp block being in contact with one of said at least one flat surface on said shank.

3. The tool of claim 1 wherein said shank portion comprises two flat surfaces with each of said two flat surfaces being seated against a different side of said at least four sides.

4. The tool of claim 3 wherein the cross-section of said shank includes two straight line portions.

5. The tool of claim 4 wherein said two straight line portions do not contact one another.

6. The tool of claim 1 further comprising a clamp block and wherein said shank portion comprises three flat surfaces, said clamp block being in contact with one of said three flat surfaces and the other two flat surfaces being seated against a different side of said at least four sides.

7. The tool of claim 6 wherein the cross-section of said shank includes three straight line portions.

8. The tool of claim 7 wherein said three straight line portions do not contact one another.

* * * * *